(12) United States Patent
Stanko et al.

(10) Patent No.: US 9,175,691 B2
(45) Date of Patent: Nov. 3, 2015

(54) GAS COMPRESSOR CONTROL SYSTEM PREVENTING VIBRATION DAMAGE

(71) Applicant: Praxair Technology, Inc., Danbury, CT (US)

(72) Inventors: Michael J. Stanko, Grand Island, NY (US); John H. Royal, Grand Island, NY (US); Ahmed F. Abdelwahab, East Amherst, NY (US); Carl L. Schwarz, East Aurora, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 343 days.

(21) Appl. No.: 13/644,066

(22) Filed: Oct. 3, 2012

(65) Prior Publication Data

US 2014/0093396 A1    Apr. 3, 2014

(51) Int. Cl.

| F04D 27/02 | (2006.01) |
|---|---|
| F04D 29/66 | (2006.01) |
| F04C 28/14 | (2006.01) |
| F04B 49/20 | (2006.01) |
| F04D 29/46 | (2006.01) |

(52) U.S. Cl.
CPC ............ *F04D 27/0246* (2013.01); *F04B 49/20* (2013.01); *F04C 28/14* (2013.01); *F04D 27/0261* (2013.01); *F04D 27/0284* (2013.01); *F04D 29/462* (2013.01); *F04D 29/668* (2013.01)

(58) Field of Classification Search
CPC ........ F04B 49/065; F04B 49/06; F04B 49/20; F04B 49/00; F04D 27/0246; F04D 27/0284; F04D 27/0261; F04D 29/668; F04D 17/162; F04D 17/065; F04D 29/664; F04C 14/08; F04C 28/14; F01D 17/06; F01D 17/205

USPC ................. 417/18, 20, 22, 23, 26, 28, 29, 42
See application file for complete search history.

(56) References Cited

U.S. PATENT DOCUMENTS

| 4,102,604 | A | * | 7/1978 | Rutshtein et al. ............... 417/19 |
|---|---|---|---|---|
| 4,151,725 | A | * | 5/1979 | Kountz et al. .................. 62/182 |
| 5,355,691 | A | * | 10/1994 | Sullivan et al. ................. 62/201 |
| 5,428,965 | A | * | 7/1995 | Grunwald et al. .............. 62/180 |
| 5,947,680 | A | * | 9/1999 | Harada et al. ................... 415/17 |
| 6,616,421 | B2 | * | 9/2003 | Mruk et al. .................... 417/350 |
| 2005/0223737 | A1 | * | 10/2005 | Conry ............................ 62/510 |

FOREIGN PATENT DOCUMENTS

GB    2 316 772 A    3/1998

\* cited by examiner

*Primary Examiner* — Bryan Lettman
*Assistant Examiner* — Timothy P Solak
(74) *Attorney, Agent, or Firm* — David M. Rosenblum; Robert J. Hampsch

(57) ABSTRACT

A method and apparatus for producing and controlling flow rate of a compressed gas produced by a compression system having one or more stages of compression formed by a centrifugal compressor or compressors, inlet guide vanes to control flow through the compression stage or stages and an electric motor directly coupled to the stage or stages having a restricted speed zone within which vibrational modes can damage the electric motor. A desired flow rate is obtained by speed adjustment alone and with the inlet guide vanes positioned at 0° when the speed will lie above or below the restricted speed zone. Where a desired flow rate would require extended operation of the electric motor at a speed within the restricted speed zone, the speed is set to the uppermost level of the restricted speed zone and the desired flow rate is obtained through appropriate positioning of the inlet guide vanes.

9 Claims, 9 Drawing Sheets

GAS COMPRESSOR CONTROL SYSTEM PREVENTING VIBRATION DAMAGE

FIELD OF THE INVENTION

The present invention relates to a method and apparatus for producing a compressed gas and for controlling the flow rate of the compressed gas in which a compressor is directly coupled to an electric motor and a restricted speed zone exists where vibrational modes can damage the electric motor and/or the compressor. More particularly, the present invention relates to such a method and apparatus in which a desired flow rate is obtained by controlling the speed of the electric motor when such flow rate can be obtained by a speed that is not within the restricted speed zone and through inlet guide vane manipulation when such flow rate would otherwise be obtained by a speed within the restricted speed zone.

BACKGROUND OF THE INVENTION

Gases are typically compressed in compressors that are driven by electric motors. The compressors can be connected so that the gas is compressed in stages from ambient to a high delivery pressure. Interstage cooling is employed to remove the heat of compressor between stages. A common compressor design that is utilized is a centrifugal compressor. In a centrifugal compressor, the gas to be compressed enters an inlet and is compressed by action of an impeller that is rotated by the electric motor. The gas then passes through a diffuser and is discharged from a volute of spiral-like configuration.

In many industrial processes employing compressors, it is necessary to reduce or increase the flow rate of the gas to be compressed from a design level of flow rate. For instance, in cryogenic air separation, air is compressed in a series of compression stages, cooled to a temperature suitable for the rectification of the air and then introduced into a distillation column system to separate the air into its component parts, for instance, oxygen, nitrogen and argon. In order to optimize the margin in the sale of separated products, it is important that electrical energy costs be minimized. Since, the cost of electrical power will vary with the time of day, it is most cost efficient to conduct the air separation at off-peak times, for example during the evening. As such, during peak times, where energy costs are most expensive it can be profitable to turn the plant down by decreasing the flow rate of the air that is compressed.

The gas flow rate through a compression system can be controlled by an arrangement of inlet guide vanes that can be set from an open position to increasing more closed positions to impart a swirl into the incoming gas and thereby decrease the gas flow rate. More recently, high speed motors have become available that can be directly coupled to a compressor. Such motors also have a speed control that allows the speed of the compressor to be accurately controlled. This control of speed allows the flow rate of the gas to also be controlled in a more thermodynamically efficient manner than with the use of inlet guide vanes. An example of such a motor are permanent magnet motors having a variable frequency drive to control the speed. Such motors can be directly connected to the compressors or each of the compressors in a compression system.

There are certain limitations on the use of a speed control to control the flow rate of the gas to be compressed by the compressor. One major limitation concerns undesirable vibration modes within an intended operational speed range for the turbomachine. Since operating on or near these modes can cause rotor displacements that can cause damage to the rotor sufficient to render the motor inoperable, it is common practice to set restricted speed zones and avoid operation on or near these undesirable vibration modes. The width of such zones can render important operation ranges of the motor; and therefore, the compressor unusable.

As will be discussed, the present invention provides a method and apparatus for compressing the gas in which desired flow rates of the gas can be safely obtained over the entire operational range of the motor while the overall compressors thermodynamic efficiency is maximized.

SUMMARY OF THE INVENTION

The present invention provides a method of producing a compressed gas and controlling flow rate of the compressed gas in which the gas is compressed within a compression system having at least one stage of compression to compress a gas and thereby to produce the compressed gas and an electric motor directly coupled to the at least one stage of compression. The motor has a restricted speed zone within which vibrational modes can damage the compression system. More specifically, the damage to the compression system can be damage to the motor and/or the compressor coupled to the motor. The at least one stage of compression can comprise a centrifugal compressor having inlet guide vanes to control the flow rate of the compressed gas to a desired flow rate and the electric motor can have a speed controller to control the speed of the motor and therefore, an impeller of the centrifugal compressor to also control the flow rate of the compressed gas to the desired flow rate. When the desired flow rate is able to be obtained with the speed of the electric motor situated above or below the restricted speed zone, the flow rate is controlled to achieve the desired flow rate by controlling the speed of the electric motor with the speed controller and with the inlet guide vanes set at a 0° swirl angle. As used herein and in the claims and as would be well known to those skilled in the art, the term "0° swirl angle" when used in connection with the position of the inlet guide vanes means that the vanes are set a wide open position such that the flow out of the inlet guide vanes is parallel to a centerline of the flow which commonly would be the centerline of a pipe feeding the gas to the inlet of the compressor. When the desired flow rate is not able to be obtained without the speed of the electric motor situated within the restricted speed zone, the speed of the electric motor is controlled with the speed controller such that the speed is set at an upper speed, above the restricted speed zone and the inlet guide vanes are set to obtain the desired flow rate.

The flow rate of the compressed gas can be measured downstream of the compression system to obtain a measured flow rate. The measured flow rate can be compared with the desired flow rate to obtain an error in the desired flow rate if a difference between the measure flow rate and the desired flow rate exists. When the desired flow rate is able to be obtained with the speed of the electric motor situated above or below the restricted speed zone, the error in the desired flow rate is minimized by adjusting the speed of the electric motor with the speed controller. When the desired flow rate is not able to be obtained without the speed of the electric motor situated within the restricted speed zone, the error in the desired flow rate is minimized by adjusting the inlet guide vanes.

When a current speed of the electric motor is situated at the upper speed, above the restricted speed zone and the desired flow rate is currently obtained by adjusting the inlet guide vanes to a current position of the inlet guide vanes and a new speed of the electric motor, below the restricted speed zone, is required to obtain a new desired flow rate, the speed of the electric motor is decreased in decreasing speed steps. At the same time, the inlet guide vanes are successively opened during each of the decreasing speed steps such that the inlet guide vanes are set at the 0° swirl angle at a lower speed, below the restricted speed zone. The speed is thereafter, decreased until the new speed is obtained.

When the current speed of the electric motor is situated below the restricted speed zone and the desired flow rate is not able to be obtained without the speed of the electric motor situated within the restricted speed zone, the position of the inlet guide vanes required to obtain the desired flow rate at the upper speed, above the restricted speed zone, is calculated. The speed of the electric motor, with the inlet guide vanes set at the 0° swirl angle, is set at the lower speed, below the restricted speed zone. Thereafter, the speed of the electric motor is increased in increasing speed steps until the upper speed, above the restricted speed zone is obtained. Additionally, the inlet guide vanes are successively closed during each of the increasing speed steps such that the position of the inlet guide vanes required to obtain the desired flow rate will be reached when the upper speed, above the restricted speed zone, is reached. In this regard, as would be well understood by those skilled in the art, the successive closing of the inlet guide vanes would impart more swirl to the flow entering the compressor and therefore, decrease the flow rate to the desired flow rate.

The electric motor can be a high speed permanent magnet motor and the speed controller can be a variable frequency drive. In such case, the compression system can have two stages of compression to compress the gas. The centrifugal compressor is a first centrifugal compressor mounted on one end of a motor shaft of the high speed permanent magnet motor to form a first of the two stages of compression and to compress the gas to a first pressure. A second centrifugal compressor, in flow communication with the first centrifugal compressor, is mounted on the other end of the motor shaft to form a second of the two stages of compression to further compress the gas to a second pressure, higher than the first pressure.

In an alternative embodiment, the compression system can have two centrifugal compressors having a common feed through which the two centrifugal compressors are fed with the gas and a common outlet from which the compressed gas is discharged. The centrifugal compressor is a first of the two centrifugal compressors mounted on one end of a motor shaft of the high speed permanent magnet motor and a second of the two centrifugal compressors is mounted on the other end of the motor shaft. Each of the first and the second of the two centrifugal compressors have the inlet guide vanes.

The present invention also provides an apparatus for producing a compressed gas and controlling flow rate of the compressed gas. The apparatus comprises a compression system having at least one stage of compression to compress a gas and thereby to produce the compressed gas. An electric motor, directly coupled to the at least one stage of compression, has a restricted speed zone within which vibrational modes can damage the compression system. The at least one stage of compression can comprise a centrifugal compressor having inlet guide vanes responsive to an inlet guide vane positioning signal to control the flow rate of the compressed gas to a desired flow rate and the electric motor has a speed controller responsive to a speed control signal to control the speed of the motor and therefore, an impeller of the centrifugal compressor to also control the flow rate of the compressed gas to the desired flow rate.

A master controller generates the inlet guide vane signal and the speed control signal. The master controller is programmed to calculate a calculated speed of the electric motor to obtain the desired flow rate and an inlet guide vane position at a speed level at an upper speed, above the restricted speed zone that will obtain the desired flow rate. Additionally, the master controller is also programmed to generate the speed control signal such that the speed control signal is referable to the calculated speed when the calculated speed is situated above or below the restricted speed zone and generate the inlet guide vane positioning signal such that the inlet guide vanes will be set at the 0° swirl angle. When the calculated speed is situated within the restricted speed zone, the master controller is also programmed to generate the speed control signal such that the speed control signal will be referable to the speed level at an upper speed, above the restricted speed zone and the inlet guide vane positioning signal will be referable to the inlet guide vane position that will obtain the desired flow rate.

A flow transducer is situated downstream of the compression system and is configured to generate a flow signal referable to the actual flow rate of the compressed gas. The master controller is responsive to the flow signal and is also programmed to compare the actual flow rate with the desired flow rate and generate an error in the desired flow rate if a difference between the actual flow rate and the desired flow rate exists. When the calculated speed is situated above or below the restricted speed zone, the speed signal is generated to minimize the error in the desired flow rate and when the desired flow rate is not able to be obtained without the calculated speed being situated within the restricted speed zone, the inlet guide vane positioning signal is generated to minimize the error in the desired flow rate.

The master controller is programmed such that when a current speed of the electric motor is situated at the upper speed, above the restricted speed zone and the desired flow rate is currently obtained by adjusting the inlet guide vanes to a current position of the inlet guide vanes and the calculated speed of the electric motor required to obtain a new desired flow rate is below the restricted speed zone, the speed control signal is successively generated to be referable to successively decreasing speeds of the electric motor in decreasing speed steps until a lower speed, below the restricted speed zone, is obtained. Simultaneously, the inlet guide vane positioning signal is successively generated during each successive generation of the speed control signal to be referable to successively greater openings of the inlet guide vanes such that the inlet guide vanes are set at the 0° swirl angle at a lower speed, below the restricted speed zone. Thereafter, the speed control signal is generated such that the calculated speed is obtained.

When the current speed of the electric motor is situated below the restricted speed zone and the desired flow rate is not able to be obtained without the speed of the electric motor situated within the restricted speed zone, the position of the inlet guide vanes required to obtain the desired flow rate at the upper speed, above the restricted speed zone is calculated, the speed control signal is generated to be referable to the lower speed, below the restricted speed zone, the speed control signal is successively generated to be referable to successively increasing speeds of the electric motor in increasing speed steps until the upper speed, above the restricted speed zone is obtained. Simultaneously, the inlet guide vane positioning signal is generated during each of the increasing speed steps to be referable to successively closed positions of the inlet guide vanes such that the position of the inlet guide vanes required to obtain the desired flow rate will be reached when the upper speed, above the restricted speed zone, is reached.

The electric motor can be a high speed permanent magnet motor and the speed controller can be a variable frequency drive. In such case, The compression system can have two stages of compression and the centrifugal compressor is a first centrifugal compressor mounted on one end of a motor shaft of the high speed permanent magnet motor to form a first of the two stages of compression. A second centrifugal compressor, in flow communication with the first centrifugal compressor, is mounted on the other end of the motor shaft to form a second of the two stages of compression. In an alternative embodiment, the compression system can have two centrifugal compressors having a common feed through which the two centrifugal compressors are fed with the gas and a common outlet from which the compressed gas is discharged. The centrifugal compressor is a first of the two centrifugal compressors mounted on one end of a motor shaft of the high speed permanent magnet motor and a second of the two centrifugal compressors is mounted on the other end of the motor shaft.

Each of the first and the second of the two centrifugal compressors have the inlet guide vanes and each are responsive to the inlet guide vane positioning signal.

BRIEF DESCRIPTION OF THE DRAWINGS

While the specification concludes with claims distinctly pointing out the subject matter that Applicant regards as his invention, it is believed that the invention will be better understood when taking in connection with the accompanying drawings in which:

DETAILED DESCRIPTION

Figure 1:
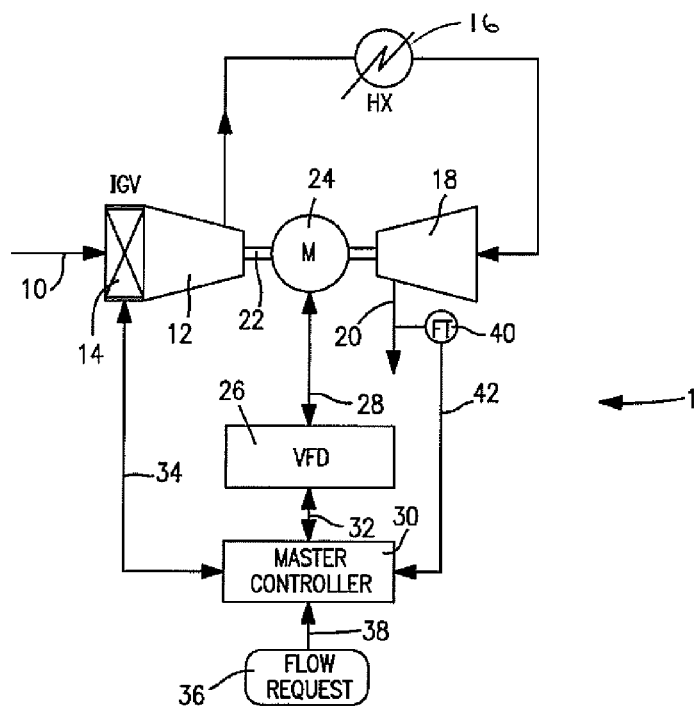
FIG. 1 is a schematic diagram of a compression system for carrying out a method in accordance with the present invention.

With reference to FIG. 1, a compression system 1 in accordance with the present invention is illustrated. Within compression system 1, a gas by way of a gaseous feed stream 10 is compressed in a first compressor 12 having inlet guide vanes 14 to adjust the flow rate of the gas to be compressed. First compressor 12 constitutes a first stage of compression. After removal of the heat of compression in an intercooler 16, the gas is further compressed in a second compressor 18 to a higher pressure to produce a compressed gas stream 20. First and second compressors 12 and 18 are centrifugal compressors of known design having an inlet, an impeller, a diffuser and a scroll-like volute to discharge the gas after having been compressed.

The first and second compressors 12 and 18 are connected to oppose ends of a motor shaft 22 of a motor 24 that drives the impellers of such compressors. Motor 24 can be a high speed permanent magnet motor. The speed of permanent magnet motor 24 is controlled by a variable frequency drive 26 that can adjust the speed of the motor 24 and therefore, also the flow rate of the compressed gas stream 20. Variable frequency drive 26 is linked to the motor 24 by an electrical connection 28. The variable frequency drive 26 is responsive to a speed control signal referable to a motor speed that is generated in a master controller 30 and transmitted to the variable frequency drive by an electrical connection 32. In addition to the foregoing, electrical connections 28 and 32 are provided between the motor 24, the variable frequency drive 28, and the master controller 30 to transmit a signal referable to the speed of the motor 24 to in effect allow the programming employed in master controller 30 to measure the actual speed of the motor 24. In case of a motor employing magnetic bearings, sensors related to such bearings would be capable of sending such a signal and is conventional. The master controller 30 also generates an inlet guide vane position signal that is transmitted to a positioner incorporated into the inlet guide vanes 14 by means of an electrical connection 34. The positioner also generates a signal proportional to the position of the inlet guide vanes that is fed back to the master controller 30 to enable the programming logic employed in the master controller 30 to in effect measure the position of the inlet guide vanes 14. The positioner and the inlet guide vanes 14 and its features discussed above are conventional and well known in the art. The master controller 30 is responsive to a flow request 36 for the compressed gas stream 20 that serves as an input 38 to the master controller 30.

As will be discussed, motor 24 has a restricted speed zone in which operation can only be conducted for a brief period of time without vibrational modes occurring that can damage the motor and/or the first and second compressors 12 and 18. When a desired flow rate is able to be obtained by speed control without the speed of motor 24 residing within the restricted speed zone, master controller 30 generates a speed control signal in response to the flow request 36 that will produce a speed within the motor 24 that will in turn produce the desired flow rate of the compressed gas stream 20. At such time, the inlet guide vane signal is generated by the master controller 30 to fully open the inlet guide vanes 14 or in other words, set the inlet guide vanes 14 to the 0° swirl position. When the desired flow rate is not able to be obtained without the speed of the motor 24 being within the restricted speed zone, the speed signal is generated by the master controller 30 to set the speed of the motor 24 to the upper speed, above the restricted speed zone and the inlet guide vane signal is generated to close the inlet guide vanes to produce the desired flow rate or in other words, impart more swirl to the incoming flow to the first compressor 12 and thereby decrease the flow rate to the desired flow rate.

Optionally, feed back can be provided by a flow transducer 40 that generates a flow signal, referable to the flow of the compressed gas stream 20, that is inputted into the master controller 30 by an electrical connection 42 should there be a difference between the measured flow rate and the flow request 36. In response to the flow signal, the master controller 30 either further adjusts the speed of the permanent magnet motor 24 or the inlet guide vanes 14 or both to minimize the error.

It is to be noted that although the present invention is described with reference to a high speed permanent magnet motor, it would have equal applicability to other high speed motors controlled by a variable frequency drive such as an induction motor and a switched reluctance motor. Further, although two compression stages are illustrated in FIG. 1, the present invention would have equal applicability to a single compression stage provided by a compressor connected to the shaft of an electric motor.

Figure 2:
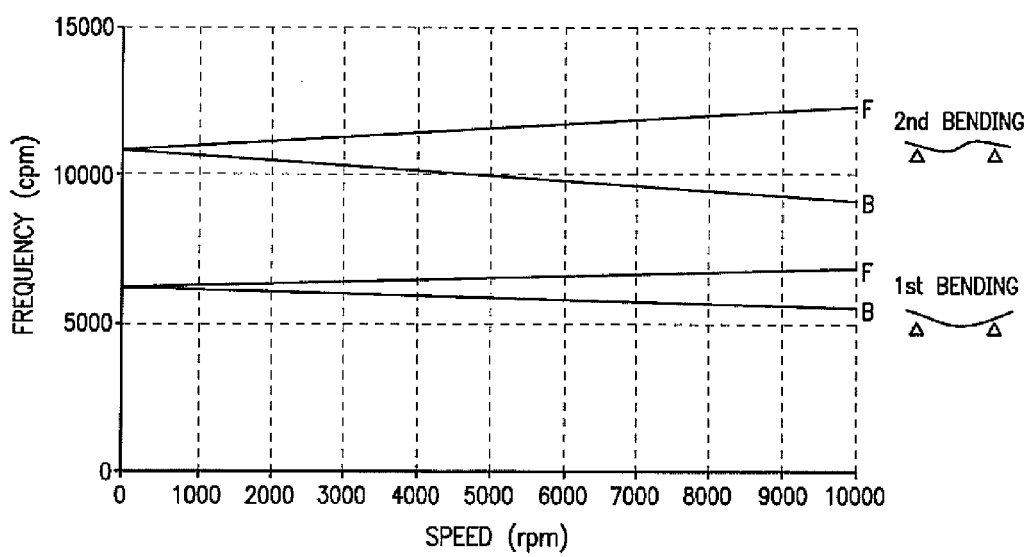
FIG. 2 is a graphical representation of speed dependent natural rotor frequencies at first and second bending modes for an electric motor utilized in the compression system of FIG. 1.

In an electric motor that is directly coupled to a centrifugal compressor either at one end of a motor shaft or where two centrifugal compressors are directly coupled to opposite ends of the rotor shaft, there are speed dependent natural frequencies for first and second bending motor shaft modes in which extended operation at such speed can damage the electric motor. As shown in FIG. 2, the bending modes have both forward and backward precession modes "F" and "B". The first bending mode has two nodes (shown by the triangles) that are typically located near the journal bearings supporting the motor shaft 22 for rotation. The second bending mode has three nodes, with the outer two nodes being typically located near such journal bearings and a central node located between the two outer nodes and between the two bearings. Excitation of the forward modes is most commonly created by rotor unbalance and non linear stiffness effects in the bearings, also known as cross coupling. Excitation of the backward modes is most commonly created by the motor shaft rubbing stationary parts such as shaft seals. Due to the ever presence of unbalance and cavity cross coupling of the forward mode, as compared with a typically brief rub event of the backward mode, greater concern is typically given to the forward processing modes while the backward modes are, in many situations ignored or discounted. Therefore, excitation amplitudes for forward modes are more prone to grow to unacceptable levels when compared to the brief rubs exciting the backward modes and can present more of an operational concern.

For example, in motor 24, a rotor containing permanent magnets is suspended for rotation by journal bearings that can be magnetic type bearings and which are provided within a motor casing. It is to be noted that hydrodynamic and airfoil type bearings are also possible. A thrust bearing, that can also can be a magnetic or also, possibly a hydrodynamic or airfoil type of bearing, is provided to absorb axial loadings. The first and second compressors 12 and 18 are connected to the motor housing of the permanent magnet motor 24 and, as indicated above, the motor shaft 22 drives two impellers located in the first and second compressors 12 and 18 situated at opposite ends of the motor shaft 22. This collection of rotating parts is referred to as the rotor. In a forward bending mode, as the shaft starts to vibrate and precess in the direction of rotation, the rotor can contact the internal stationary parts within the motor casing resulting in potential damage or destruction of the motor.

Figure 3:
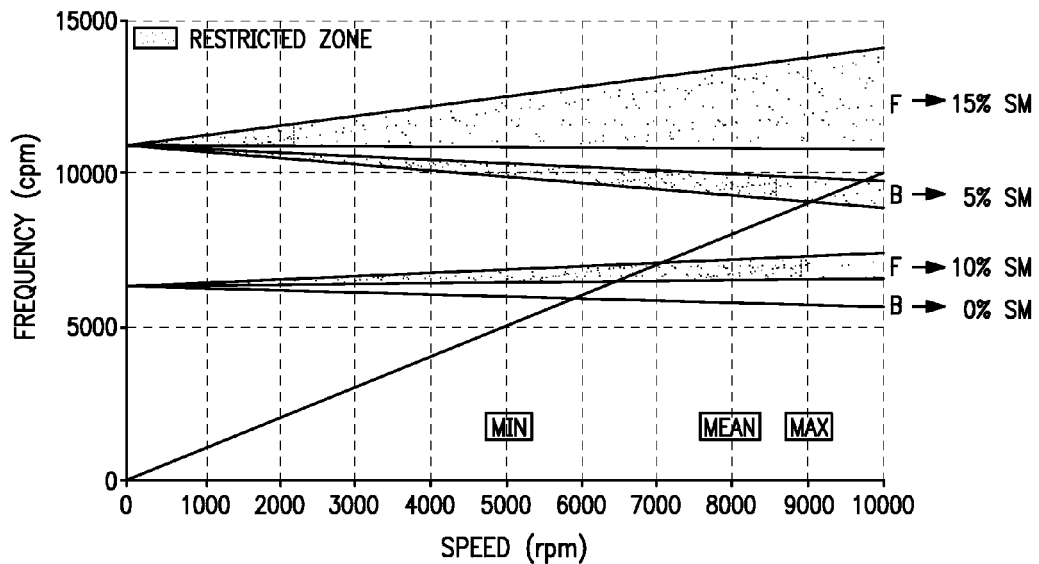
FIG. 3 is the graphical representation of speed dependent natural rotor frequencies of FIG. 2 with restricted speed zones indicated by shaded areas.

With reference to FIG. 3, separation margins are placed on the rotor natural frequencies shown in FIG. 1. For purposes of illustrating the use of a separation margin on each rotor bending mode in both forward and backward precession directions, representative, yet arbitrary values of separation margin for each mode are listed in FIG. 3 next to the abbreviation SM. The actual separation margins used are typically a function of the amount of damping present as well as experience or industrial guidelines. For instance, the American Petroleum Institute provides such guidelines in its publication API 684. It is to be noted that the rotor natural frequencies shown in this illustration are a product of analytical calculations made during the design phase of the motor. Consequently, these are predicted dynamic responses that have a degree of uncertainty. Moreover, even the same motors will have slight differences due to the tolerances involved in fabricating such motors that also will present a degree of uncertainty. The separation margins therefore represent tolerances in such lines that are present for the safe operation of the motor. The shaded area enclosed by these lines are thus, restricted speed zones for the motor where operation, while not prohibited, is restricted to brief time intervals to prevent excitation of bending modes that are possible within such zones from producing damage to the motor.

Figure 4:
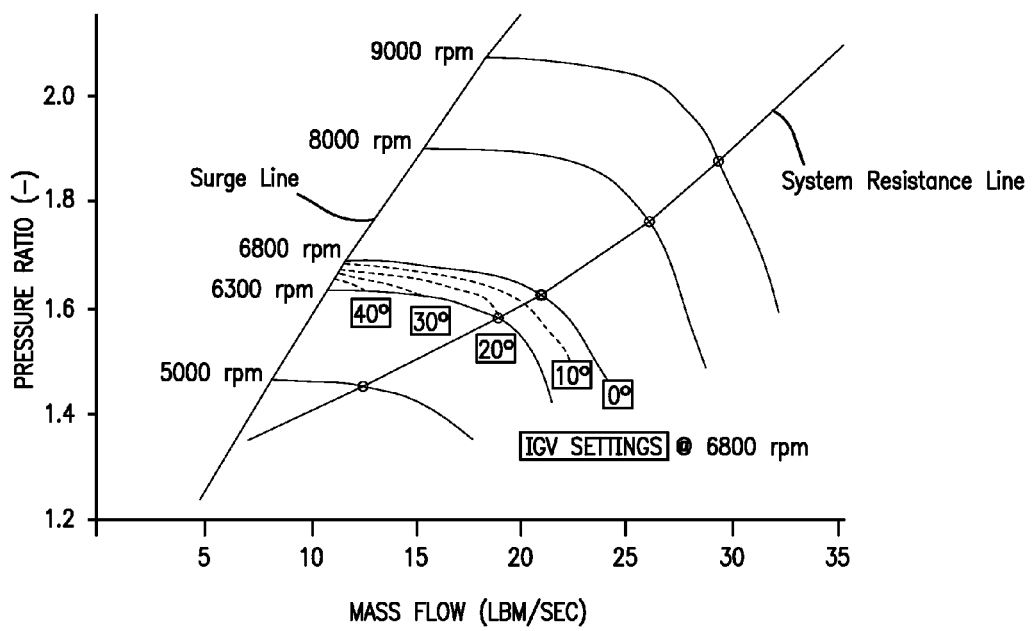
FIG. 4 is a compressor map of the compressor used in the first stage of compression of the compression system shown in FIG. 1.

The diagonal line is referred to as an operating line that has a slope of 1 to conveniently ascertain the bounds of such restricted speed zones. It is to be noted that the rotor natural frequency plots in FIGS. 1 and 2 are exemplary only and such plots will vary in different motors. Furthermore, for purposes of example, it is assumed that there exists sufficient damping provided by the bearings such that the backward precession mode of the first bending mode can be ignored. However, the backward precession mode in the second bending mode is to be avoided. However, as mentioned above, this is of less concern and therefore, the safety margin is often selected to be less than the forward precession mode of the first bending mode. It is further assumed that for purposes of example that the motor need only operate at 9000 rpms. Since this is at the lower limit of the safety margin of the backward precession mode of the second bending mode, this motor speed will represent an upper limit of operation. However, if the motor did require operation at higher speeds there could be three restricted speed zones, namely both the forward precession mode of the first bending mode, the backward precession mode of the second bending mode and the forward precession mode of the second bending mode. In this example, however, there is one restricted speed zone and the same would lie between, but would not include, 6300 and 6800 rpms. Given that the proposed operation of the motor is between 5000 and 9000 rpms, this restricted speed zone represents 12.5 percent of the operational speed range of the motor that would be unavailable for regulating the flow rate of one or more compressors connected to the motor. With reference to FIG. 4, a compressor map is shown for the compressor 12. As indicated the compressor is capable of delivering a flow rate from between 12 and 30 LBM/Sec (pound mass per second) of flow over the operating speed range. The restricted speed zone prevents delivery of mass flows from 19 LBM/Sec to 21 LBM/Sec or in other words about 17 percent of the range of flow rates to be delivered by manipulation of speed alone.

Figure 5A:
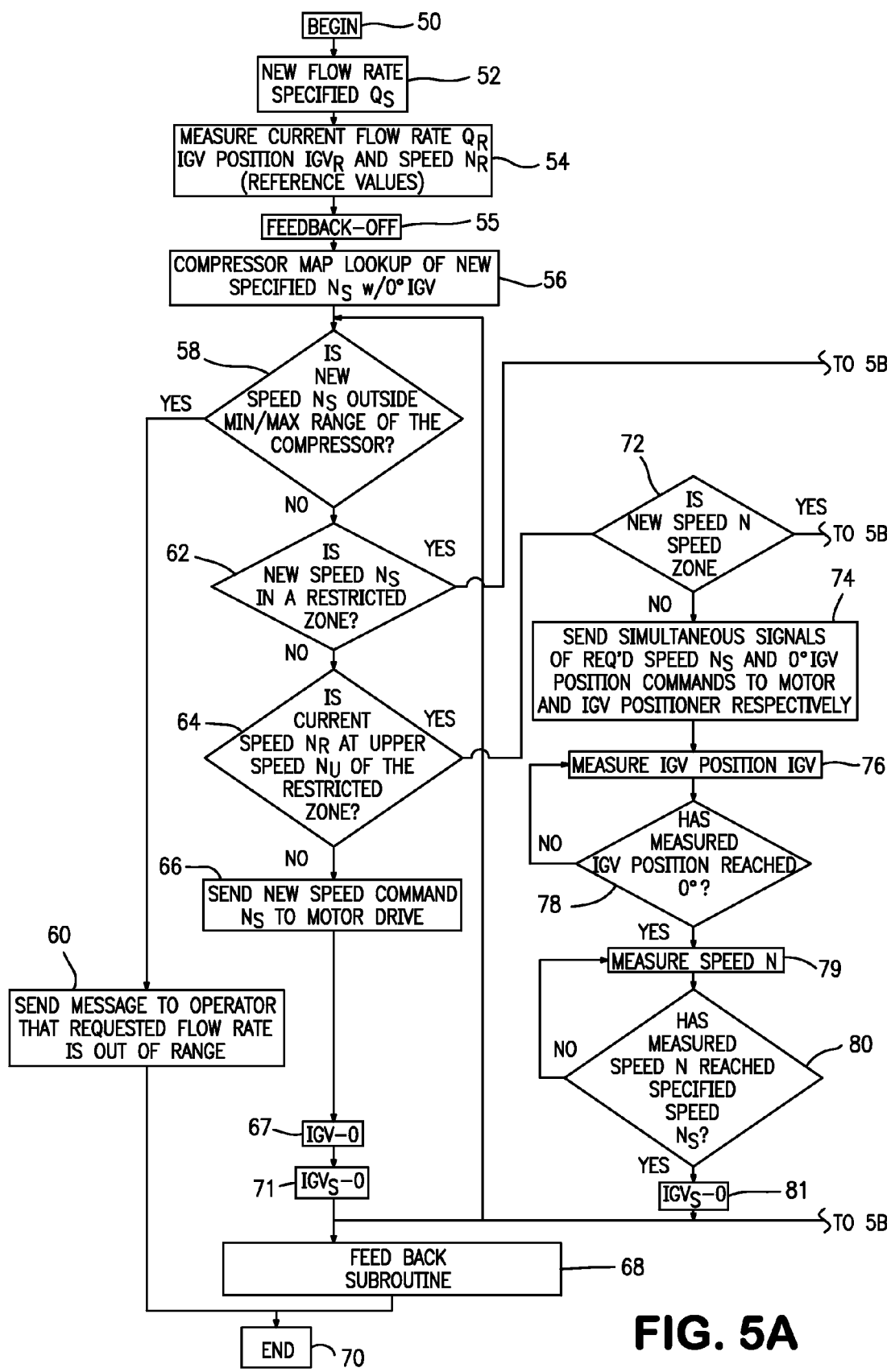
FIGS. 5A and 5B are a logic flow diagram of the programming utilized in the master controller of the compression system of FIG. 1.
Figure 5B:
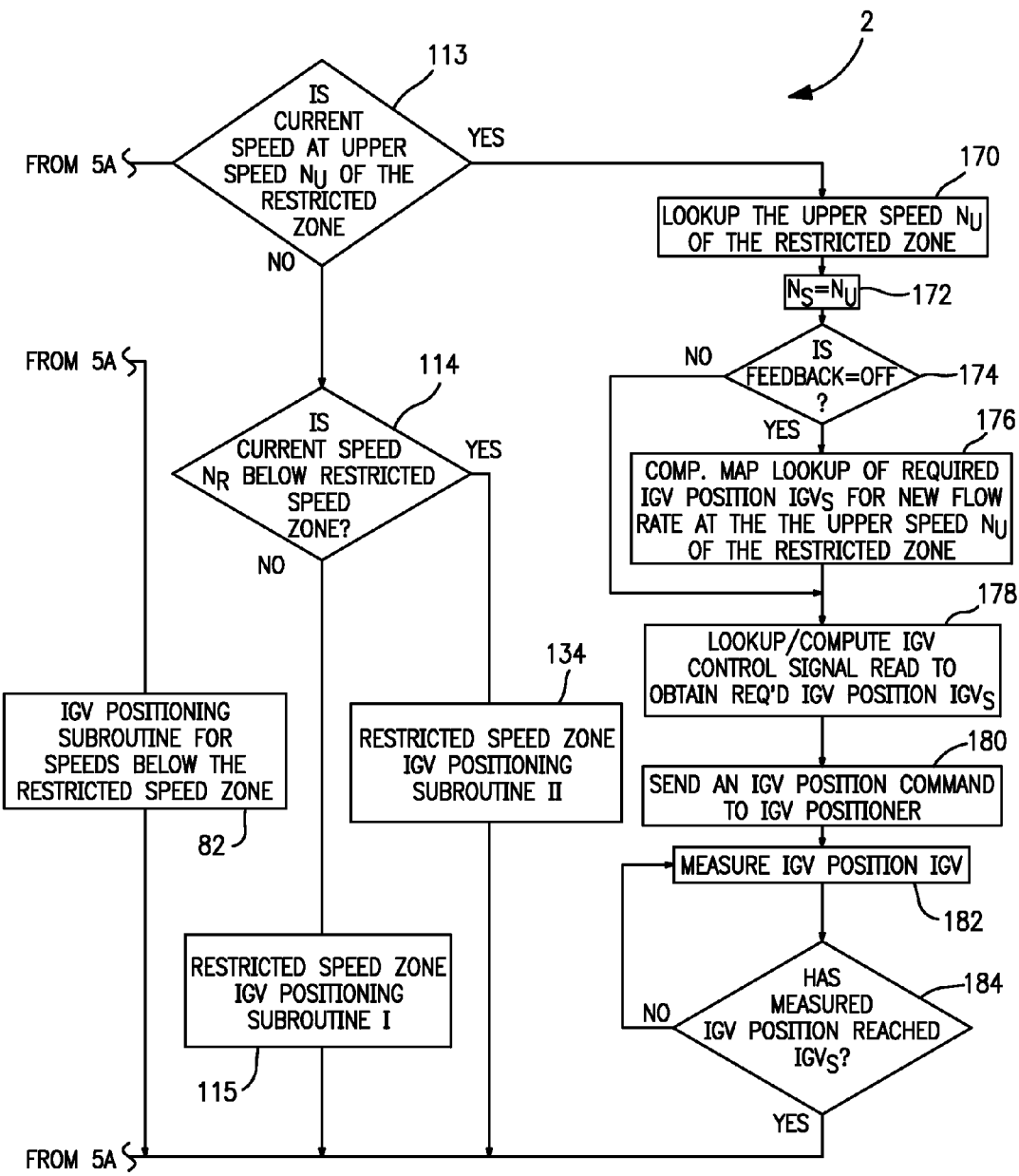

With reference to FIGS. 5A and 5B, the master controller 30 is programmed with a control program, with specific reference to FIG. 5A, the control program begins execution at the execution stage 50 "Begin" with the input a new flow rate "$Q_S$" specified in execution stage 52 through input of a flow request 36 as illustrated in FIG. 1. The current flow rate "$Q_R$" is measured by flow transducer 40 and is input into execution stage 54 along with the current speed of the $N_R$ that is preferably stored as data within the controller 30. A flag, "Feedback" is set to "off" in stage 55 and the program then proceeds to execution stage 56 in which data contained in a compressor map of the type illustrated in FIG. 4 is obtained to determine the speed of the compressor with the inlet guide vanes 14 set at 0°. This speed is referred to by the variable $N_S$.

The program then proceeds to execution stage 58 to perform a test to determine whether the new speed, "$N_S$" is outside the minimum or maximum speed of the first compressor 12. In the Example discussed above, the minimum and maximum speed of the compressor would be in a range from 5000 and 9000 rpms. If the answer to the test is yes, then execution stage 60 executes and a message is sent to the operator that the requested flow rate is out of range.

If the answer to the test is no, then execution stage 62 executes in which a test is performed to determine whether the new speed is in the restricted speed zone which in the example given above would be between 6300 and 6800 rpms. If the answer to the test is no, then execution stage 64 executes in which a further test is performed to determine whether the current speed $N_R$ is at an upper speed, above the restricted speed zone. In the example, the upper speed would be 6800 rpms since the restricted speed zone lies below this speed. It is to be noted, that such upper speed could be set higher than 6800 rpms, for instance 7000 rpms to provide even a greater margin than that calculated for the specific motor. If the answer to the test is no, then a speed signal is generated by the master controller 30 which, as indicated in execution stage 66 is sent via electrical connection 32 to the variable frequency drive 26 to in turn set the motor 24 to the speed referable to the speed signal. The program then proceeds to a "Feed Back Subroutine" 68 and then to the end of program execution as designated by reference number 70. Prior to executing the Feedback Subroutine 68, two variables "IGV" and "$IGV_S$" are both set to 0 as shown at 67 and 71, respectively. The setting of the current position of the inlet guide vanes 14 "IGV" and the specified position thereof "$IGV_S$" at 0 is necessary to allow the Feed Back Subroutine 68 to properly execute and define a new reference inlet guide vane position "$IGV_R$" to be equal to 0. The Feed Back Subroutine 68 allows the speed of the motor 24 or the position of inlet guide vanes 14 to be adjusted as required to obtain the new flow rate $Q_S$ should the measured flow rate that is obtained not be equal to $Q_S$. However, it is to be noted that embodiments of the present invention in which there is no such feed back control are possible and therefore, Feed Back Subroutine 68 is optional.

If the test in execution stage 64 is yes, then another test is performed in execution stage 72. If as indicated in execution stage 72, the test produces a negative answer, then only the speed of the motor 24 need be adjusted with a 0° swirl angle of the inlet guide vanes 14, in other words, fully open, to obtain the desired flow rate of the compressed gas stream 20. Reviewing the logic, as indicated in execution stage 62, the new speed is not in the restricted speed zone, the current speed is in a restricted speed zone as tested in execution stage 64 and since the new speed as tested in the execution stage 72 is not below the restricted speed zone, the new speed must be above the restricted speed zone. As such, in order to produce the desired flow rate, as indicated in execution stage 74, an inlet guide vane positioning signal is generated to reposition the inlet guide vanes 14 to the 0° swirl angle so that no swirl is generated and a speed control signal is generated that is referable to the desired speed that will obtain the desired flow rate. These signals are transmitted to the variable frequency drive 26 and to the inlet guide vanes 14 by electrical conductors 32 and 34, respectively. Since the positioning of the inlet guide vanes 14 is not instantaneous, a loop is performed in which a signal referable to the inlet guide vane position is transmitted from inlet guide vanes 14 back to the master controller through electrical connection 34 to measure the current position of the inlet guide vanes 14 as indicated in execution stage 76. Thereafter a test is performed as shown in execution stage 78 in which the measured inlet guide vanes position is tested against the 0° desired position. If the answer to the test is no, the execution of the control program loops back to execution stage 76 until the desire position $IGV_M$ of 0° is reached or in other words, until the test performed in execution stage 78 can be answered in the affirmative. Thereafter, the program executes a loop in which the speed "N" of the motor 24 is measured at 79 and the speed is then tested in stage 80 to determine whether the measured speed has reached $N_S$, the specified speed. If the motor 24 has not reached the specified speed, the program loops back to 79 until the measured speed has in fact reached the specified speed. At such time, the variable "$IGV_S$" is set to 0 and the programming proceeds to the Feed Back Subroutine 68 and then the program end 70. The setting of the variable "$IGV_S$" to 0 supplies a necessary variable to the Feed Back Subroutine 68 to allow it to properly execute.

Turning back to execution stage 72, if the answer to the test is in the affirmative, then the desired flow rate will be obtained at a speed of motor 24 below the restricted speed zone. While it is possible to immediately set the inlet guide vanes to a 0° position for such purposes, this may be undesirable because the speed of motor would at such time be at the uppermost level of the restricted speed zone and the flow would increase rather than decrease because at such time, the inlet guide vanes 14 are controlling the flow rate. In most applications of the present invention, it is more preferable that movement of the inlet guide vanes 14 be gradual with flow decreasing monotonically. With specific reference to FIG. 5B, in order to gradually move the inlet guide vanes 14, after an affirmative outcome of the test of execution stage 72, an IGV Positioning Subroutine for Speed Below the Restricted Speed Zone 82 executes. In the Subroutine 82, both the speed of the motor 24 is incrementally decreased while within the restricted speed zone and the inlet guide vanes 14 are incrementally opened to the 0° swirl angle. The speed of the motor is also adjusted to obtain the desired flow rate $Q_S$.

Figure 6:
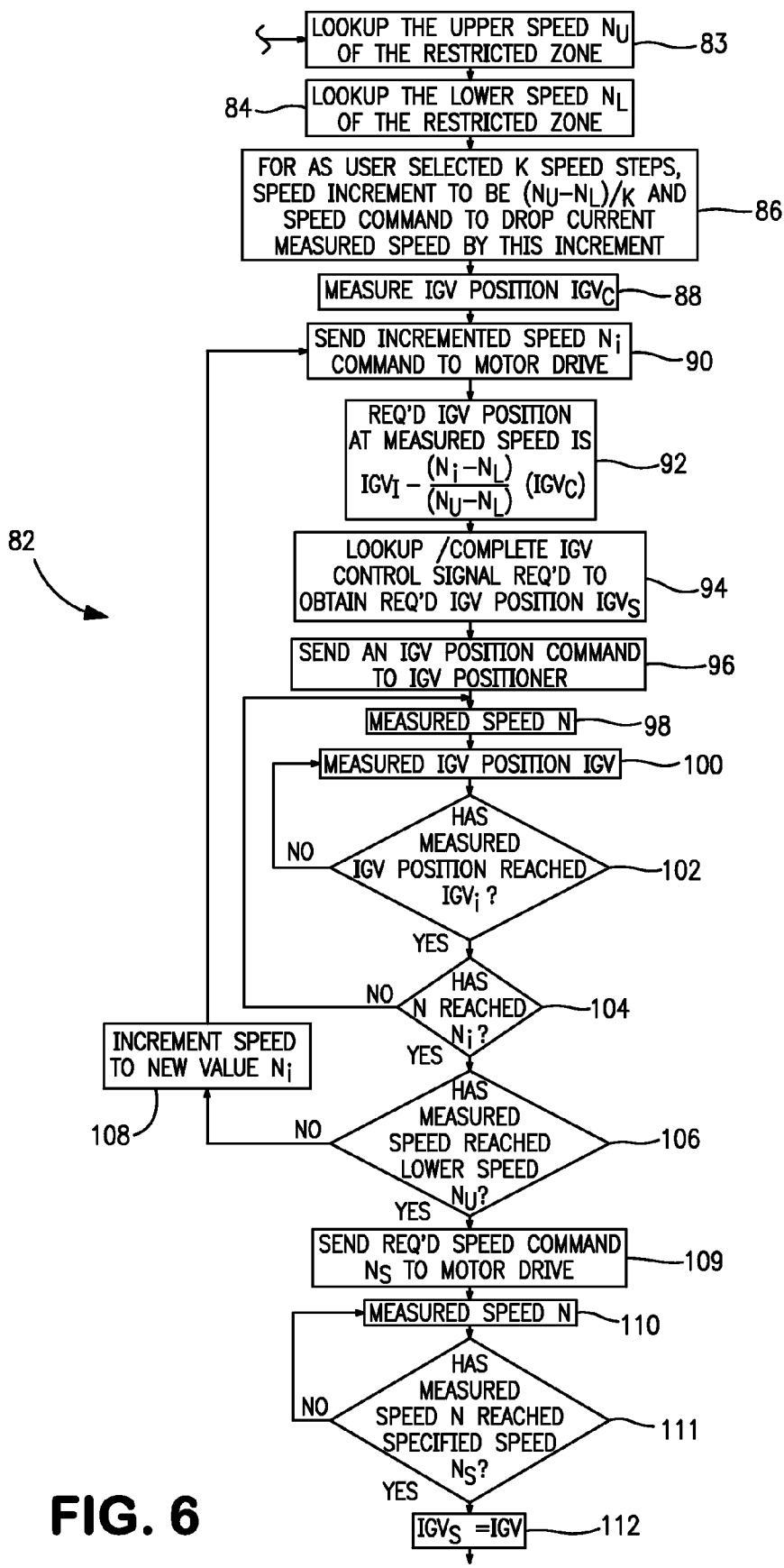
FIG. 6 is a logic flow diagram of the programming utilized in an IGV Positioning Subroutine For Speeds Below The Restricted Speed Zone shown in FIG. 5.

With reference to FIG. 6, the subroutine generally shown at 82 initiates with a lookup of the upper Speed $N_U$, above the restricted speed zone and then a look up of the lower speed $N_L$, below the restricted speed zone as indicated at 83 and 84, respectively. This "lookup" can be performed by simply reading data referable to these values, namely, 6300 and 6800 rpms. The user is able to select the number of steps that the speed will be dropped or these may be pre-programmed. In any case, assuming a user selected speed step, the same will be an input into the control program of the master controller 30 and will have a value of "K". As indicated at 86, the program then performs a calculation to determine the incremental speed drop for the motor 24 by subtracting the lower speed, below the restricted speed zone "$N_L$" from the upper speed, above the restricted speed zone "$N_U$" and dividing the difference by the number of steps "K" that the user has selected. Thus, assuming 10 steps were selected by a user, then the speed will be adjusted in decreasing steps of 50 rpms. The position of the vanes "$IGV_C$" of the inlet guide vanes 14 is then measured by transmitting the value from the inlet guide vanes 14 to the master controller 30 as shown at 88. In the next execution stage an incremented speed $N_i$ is sent to the motor 24 by means of a speed signal referable thereto generated by the programming in the master controller 30 and sent to the variable frequency drive 26 as indicated in execution stage 90. For example, assuming that the speed is at the upper speed level of 6800 rpms and ten fifty rpm steps have been selected, the first increment $N_i$ is set equal to 6750 rpms. Thereafter, the required position of the inlet guide vanes is calculated at execution stage 92. This is simply a ratio of the difference between the current incremental speed value $N_i$ and $N_L$ to the speed range of the restricted speed zone, namely $N_u$-$N_L$. This ratio is multiplied by the current position of the inlet guide vanes 14 determined at execution stage 88 above. Consequently, as $N_i$ approaches $N_L$, the position of the inlet guide vanes 14 will approach 0° swirl angle and thus, be fully opened. The results of execution stage 92 are then fed into execution stage 94 in which the inlet guide vane positioning signal value is either looked up or computed to obtain the value calculated in execution stage 92. Such signal, as indicated in execution stage 96 is then transmitted to the inlet guide vanes 14 from the master controller 30 over the electrical connection 34.

Since the reaction of motor 24 to a speed change is not instantaneous, the speed of the motor 24 is measured at 98. Further, since the positioning of the inlet guide vanes is also not instantaneous, the program loops between a step in the programming 100 in which the position of the vanes in the inlet guide vanes 14 is measured by transmittal to the master controller 30 and then a test is performed at 102 to determine whether the inlet guide vanes 14 are at the position calculated at execution stage 92 of the programming. If the result of the test of 102 is negative, then execution stage 100 is re-executed until the test is positive. At such time, a further test is performed in execution stage 104 to determine whether the speed of the motor 24, that is obtained in execution stage 98, has reached the incremented speed $N_i$. If the answer is in the negative, the programming loops back to execution stage 98. If the test of 104 is positive, or the measured speed has reached the incremented speed, then as set forth in execution stage 106, the speed is tested to determine whether the speed measured in stage 98 has reached the lower speed, below the restricted speed zone $N_L$. If the answer to such test is no, then the speed is incremented to a new value of $N_i$ as indicated in execution stage 108. For instance, if the speed is presently at 6750 rpms, then the next increment in a user specified 10 step routine would be 6700 rpms, assuming a 50 rpm increment. The program would then loop back to execution stage 90 to set the new increment in the speed to the motor 24. If, however, the answer to the test of execution stage 106 is in the affirmative, the inlet guide vanes 14 are set in the fully open position and at the 0° swirl angle. In stage 109 of the programming, a speed signal is generated that will send the required speed to produce the desired flow, as determined in execution stage 56, to the variable frequency drive 26 to set the motor 24 at such speed. The programming will then proceed to a loop in which the speed is measured in stage 110 and then tested in 111 to determined whether the measured speed has reached the specified speed $N_S$. When the test is in the positive, the variable $IGV_S$ is set equal to IGV as indicated in step 112 and the programming proceeds to the Feed Back Subroutine 68 and program end 70. The setting of "$IGV_S$" to be equal to "IGV" allows the Feed Back Subroutine 68 to properly execute.

With reference again to FIG. 5A and to execution stage 62, assuming the answer to the test is yes because the new speed is in a restricted speed zone, execution stage 113 is next executed as shown in FIG. 5B. Execution stage 113 tests whether the current speed is at the upper speed $N_U$, above the restricted speed zone. Assuming it is not and therefore, the answer to the test is no, then the current speed can either be above or below the restricted speed zone. This is determined in execution stage 114 and assuming that the answer to the test is no, then, the Restricted Speed Zone IGV Positioning Subroutine I is executed as set forth at 115. In this subroutine, the speed of motor 24 will be set at the upper speed above the restricted speed zone and the desired flow rate will be obtained with the inlet guide vanes 14 to impart the requisite swirl to the flow.

Figure 7:
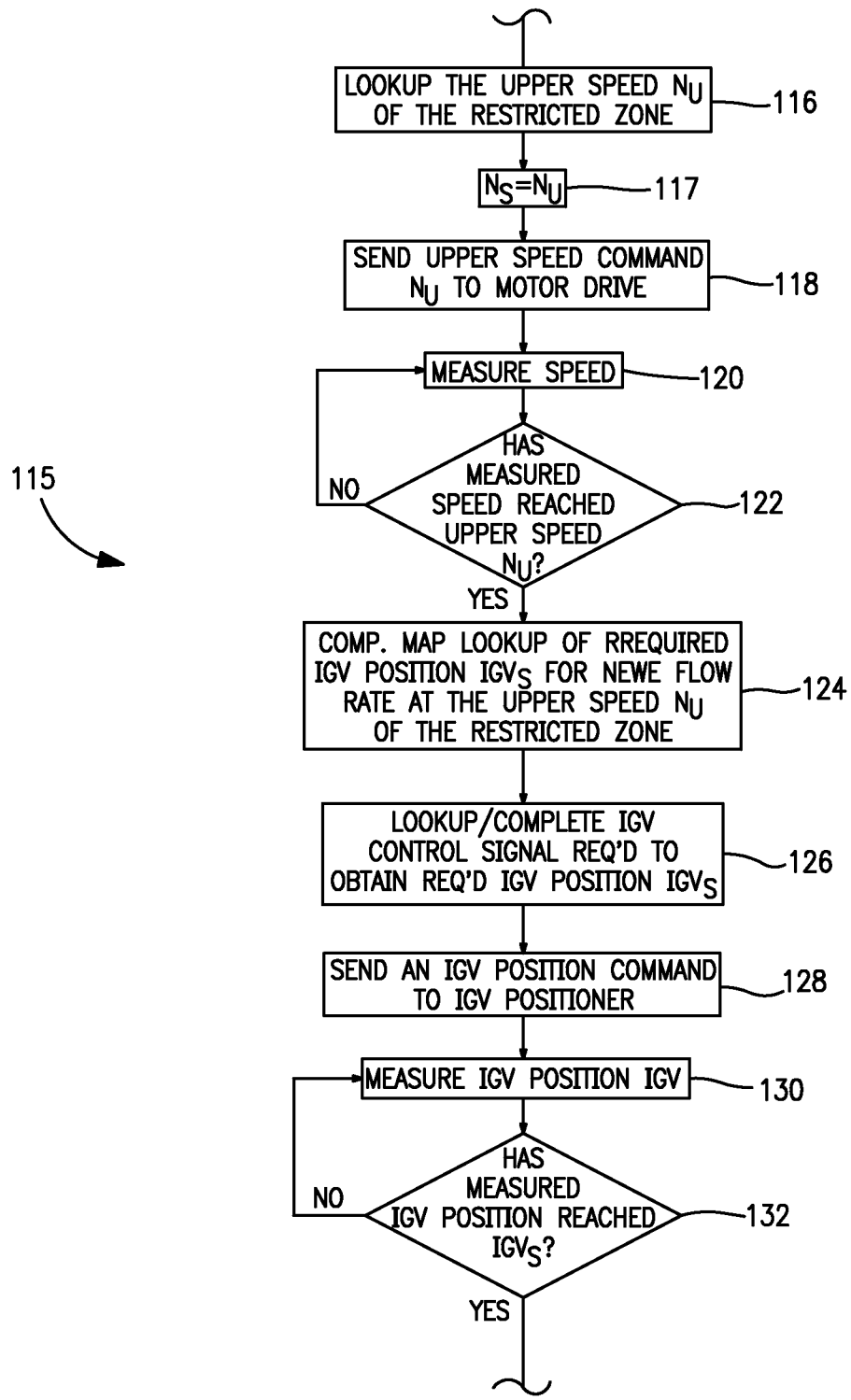
FIG. 7 is a logic flow diagram of the programming utilized in a Restricted Speed Zone IGV Positioning Subroutine I shown in FIG. 5.

With additional reference to FIG. 7, the logic employed in the programming of the subroutine of 115 begins at execution stage 116 with a lookup of the upper speed "$N_U$", above the restricted speed zone which in the example is 6800 rpms. Again, for purposes that will be discussed, the specified speed variable $N_S$ is set to $N_U$ at 117. A speed signal is then generated by the master controller 30 which is transmitted to the variable speed drive 26 and the motor 24 is set to operate at such speed as set forth in execution stage 118. Since the speed was above the upper speed, above the restricted speed zone, the motor 24 must decelerate. As such a loop is executed in which the speed of the motor 24 is measured at 120 and then a test is performed in execution stage 122 to determine whether the motor 24 has reached the upper speed above the restricted speed zone. When the answer to the test is yes, the programming proceeds to 124 where a lookup is performed in a lookup table to determined the position of vanes in inlet guide vanes 14 to obtain the new flow rate that has been requested as set forth at reference number 36 in FIG. 1 and in particular, the execution stage 52 of the programming. With reference again to FIG. 4, the dashed lines represent possible swirl angle positions of the inlet guide vanes 14 to obtain the desired flow rates at a speed set at the upper limit of the restricted speed zone. The position selected would be at the intersection of the dashed lines with the system resistance line at which pressure ratios and mass flow are obtained at specific compressor speeds. In this particular compressor vane positions of between 0° and 20° would be available to obtain the desired flow rates within the restricted speed zone. Data concerning the vane positions and mass flow would be stored in the look up table and points between actual stored data could be interpolated.

Following execution stage 124, either by means of a lookup table or computation an inlet guide vane positioning signal is computed for the inlet guide vanes 14 at 126 and the signal is then sent to the inlet guide vanes 14 at 128 from the master controller 30. Since the positioning of the inlet guide vanes 14 is not instantaneous, a loop is performed in which the position of the vanes within the inlet guide vanes 14 is measured at 130 and a test is performed at 132 to determine whether the inlet guide vanes 14 are at the position to obtain the desired flow rate. When the answer to the test is yes, then the programming proceeds to the feed back subroutine 68 and then to end 70.

With reference to FIG. 5B, assuming that the test performed in execution stage 114 is in the affirmative or in other words, the current speed is below the restricted speed zone, the programming contained in the Restricted Speed Zone IGV Positioning Subroutine II 134 is executed. In this subroutine, the speed of the motor is increased to the lower speed below the restricted speed zone and then the speed is incrementally increased until the upper speed above the restricted speed zone is reached. During each increment in the speed, the inlet guide vanes 114 are incrementally closed until a position is reached at which the desired flow rate will be obtained with the speed of the motor 24 at the upper speed, above the restricted speed zone.

Figure 8:
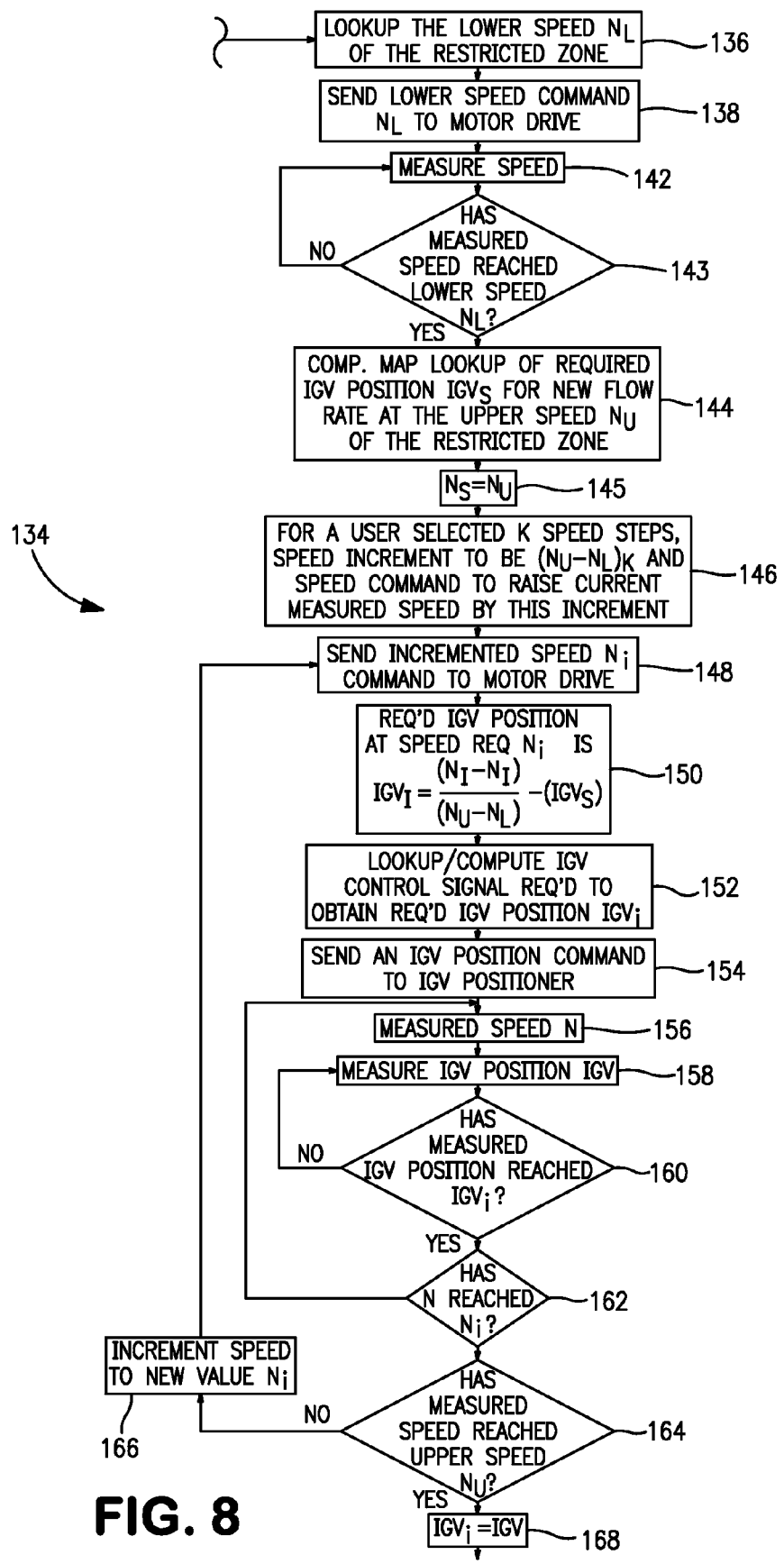
FIG. 8 is a logic flow diagram of the programming utilized in a Restricted Speed Zone IGV Position Subroutine II shown in FIG. 5.

Specifically, with additional reference to FIG. 8, the subroutine 134 is programmed so that first the lower speed, below the restricted speed zone "$N_L$" is determined in execution stage 136. A speed signal referable to the lower speed "$N_L$" is then generated by the master controller 30 and transmitted to the variable frequency drive 26 to adjust the speed of the motor 24 to such speed as indicated in execution stage 138. Since the acceleration of the motor 24 is not instantaneous, a loop is then performed in which the speed of the motor 24 is measured at 142 and then tested in execution stage 143 to determine whether the motor speed has reached the lower speed, below the restricted speed zone. When the answer is in the affirmative, then a lookup in a lookup table is performed in execution stage 144 to determine the positioning of the inlet guide vanes 14 to obtained the desired flow rate of the compressed gas stream 20 at the upper speed, above the restricted speed zone by means of the use of data of the type mentioned above with respect to FIG. 4. For purposes that will be discussed the variable "$N_S$" is set to the upper speed variable "$N_U$" at 145. Thereafter, in execution stage 146, the user, as in input to the master controller 30 can specify a number of steps "K" to increment the speed to raise the speed of the motor 24 from the lower speed, below the restricted speed zone to the upper speed, above the restricted speed zone. This speed increment is given by the difference between the uppermost and lower speeds divided by the increment. For instance, in the example above, if ten increments were desired, then the speed increment would be 50 rpms. For example, assuming that the speed is at the lower level of 6300 rpm and ten fifty rpm steps have been selected, first speed increment "$N_I$" is set equal to 6350 rpm.

In the next stage of execution designated by reference number 148, a speed signal is generated referable to the incremented speed, "N," that is generated by the master controller 30 and transmitted to the variable frequency drive 26 to set the motor to the incremented speed. The position of the inlet guide vanes 14 is also incremented by a ratio multiplied by the required inlet guide vane position "$IGV_S$" of the inlet guide vanes 14 in execution stage 150. This ratio is between a difference between the current value of $N_i$ and the lower speed level of the restricted speed zone ($N_i$–$N_L$) divided by the difference between the uppermost and lower speeds of the restricted speed zone ($N_U$–$N_L$). When the incremented speed is equal to $N_U$, obviously the ratio will be equal to 1 and the inlet guide vane position will be equal to $IGV_S$. The incremental value of the inlet guide vane position $IGV_i$ determined at 150 is then used to lookup or compute an inlet guide vane positioning signal in execution stage 152 that will be generated by master controller 30. This signal is sent to inlet guide vanes 14 in execution stage 154 to incrementally close the inlet guide vanes 14.

The programming then executes a loop in which the speed of the motor 24 and position of the inlet guide vanes 14 are measured in 156 and 158, respectively. Then a test is performed in execution stage 160 to determine whether the measured position of the inlet guide vanes 14 has reached the value calculated in execution stage 150. When the answer to this test is yes, then the measured speed N is compared to the incremented speed $N_i$ at 162. If the answer to the test is in the negative, the programming loops back to 156. If the answer to the test of 160 is in the affirmative, then a test is performed at 164 to determine whether the measured speed has reached the upper speed above the restricted speed zone "$N_U$". If the test performed in execution stage 164 is negative, then the speed is incremented to a new value of $N_i$ at 166 and the programming loops back to execution stage 148 to set the motor 24 to operated at the incremented speed. When the answer to the test of 164 is "yes" in that speed has in fact reached the upper limit of the restricted speed zone, for purposes of proper execution of the Feed Back Subroutine 68, the variable "$IGV_s$" is set equal to "IGV" at 168. The Feed Back subroutine 68 is then executed and the programming will then proceed to end at 70.

Referring back to FIG. 5B and to execution stage 113, if the current speed is at the upper speed, above the restricted speed zone, a lookup is performed at 170 to determine "$N_U$", the upper speed, above the restricted speed zone. The variable $N_S$ is set equal to $N_U$ at 172 and the flag "Feedback" is tested at 174 as to whether it is set "Off". If the answer to this question is yes, as would be the case if the feed back subroutine were not reached directly before the time of such test, a lookup is performed at 176 in a lookup table to determine the required position of the inlet guide vanes 14 in a manner discussed above with respect to the type of data shown in FIG. 4. Thereafter, in execution stage 178, the required inlet guide vane positioning signal is either determined from a lookup table or computed. The inlet guide vane positioning signal is then generated by master controller 30 and sent to inlet guide vanes 14 in execution stage 180. A loop is then executed wherein the position of the inlet guide vanes 14 is measured at 182 and a test is performed to determine whether the measured value has reached the required position of the inlet guide vanes at 184. When the answer to the test is yes, the programming proceeds to the feed back subroutine 68 and then the program end 70.

It is to be noted that in the subroutines and programming discussed above, the inlet guide vanes 14 are being opened in a ratio related to the current incremented speed. It is possible, however, that such incremental opening could be by a fixed percentage and the speed could be incremented by a fixed percentage. However, as can be appreciated, if this were done, then either required speed would be reached before the required inlet guide vane opening or vice-versa. In such case programming would also have to be provided to obtain the required speed or inlet guide vane opening in a percentage that completed the speed or required opening. Such final percentage would differ from the fixed percentage. At the other extreme it is also possible to simply open the inlet guide vanes to the 0° position while sending a speed command to the motor 24 at which the motor will runs at the speed $N_S$ that will produce the desired flow rate.

Figure 9:
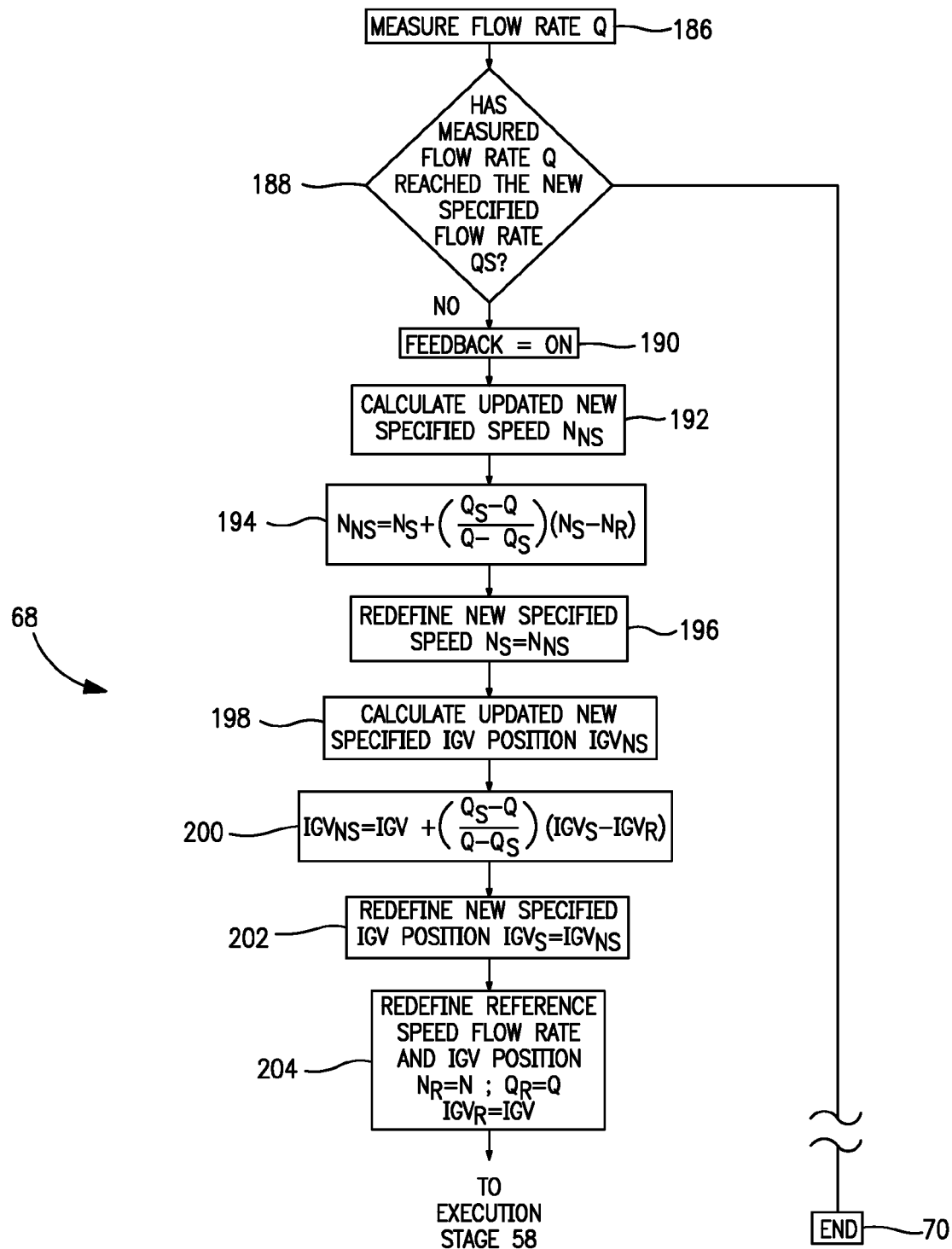
FIG. 9 is a logic flow diagram of the programming utilized in a Feed Back Subroutine shown in FIG. 5.

With Reference to FIG. 9, feed back control may be executed by the Feed Back Subroutine 68 to make certain that the measured flow rate "Q" has in fact reached the specified flow rate "$Q_S$". It is to be noted that an embodiment of the present invention is possible that does not use such feed back control and would depend on calculated values for control of flow rate. However, assuming such feed back control is employed, as indicated, the flow rate is measured at 186 by such means as the flow transducer illustrated in FIG. 1 and a test is performed at 188 to determine whether the "Q" is equal to "$Q_S$". If this has in fact occurred, then the programming proceeds to end 70 and no feed back control is required. Assuming that the test of 188 is "no", then the flag "Feedback" is set to "on" at 190. Thereafter, as indicated at 192, an updated, new specified speed $N_{NS}$ is calculated. This calculation is performed in execution stage 194. In this calculation, the current value of $N_S$, the specified speed of the motor 24, is increased or decreased by a ratio of a difference between the specified and measured flow rates ($Q_S$–Q) and a difference between the measured flow rate and the reference flow rate ($Q$–$Q_R$) that is in turn multiplied by a difference between the current value of the specified speed and the reference speed ($N_S$–$N_R$). The value of $N_S$ is then redefined as $N_{NS}$ as shown in execution stage 196.

After the calculation of the new specified speed, a calculation is performed for new specified IGV position, "$IGV_{NS}$" as shown at 198. As indicated at 200, $IGV_{NS}$ is the current specified value of the inlet guide vanes 14, or $IGV_S$ either increased or decreased by the same ratio of flow rates used in the calculation of the new specified speed multiplied by a difference between $IGV_S$ and $IGV_R$. The new specified position of the inlet guide vanes 14 is then redefined in execution stage 202. It is to be noted that if the programming has proceeded from execution stages 67 and 71 or from execution stage 81 or from subroutine 82, then $IGV_{NS}$ will remain at 0 or in other words, the 0° swirl angle. If the programming has proceeded from subroutines 115 and 134 or execution stage 184, the value of $IGV_S$ will be that value defined in such subroutines or execution stage 184.

After the computation of the new specified speed of the motor 24 and the new specified position of the inlet guide vanes 14, as shown in execution stage 204, a new reference speed, reference flow rate and reference IGV position are defined by the current measured speed of the motor 24, the current measured flow rate and the current measured position of the inlet guide vanes 14. The programming than loops back to execution stage 58.

Assuming that the values of $N_S$ and $N_R$ are not in a restricted speed zone, the speed of the motor 24 will be adjusted in execution stage 66, subsequent to the feed back subroutine 68 by either increasing or decreasing the speed of the motor until Q is equal to $Q_S$. In other words, the speed in such case is adjusted to minimize the error in the flow. Another possibility is that $N_S$ will be in the restricted speed zone and the current speed of the motor will be at the upper speed level $N_U$, above the restricted speed zone. In such case, the answer to the test of execution stage 113 would be "yes". However, the flag "feedback" would be set to "on". In such case, execution stage 176 would be by-passed as the answer to the test of execution stage 142 would be yes, and the value of $IGV_S$ to be sent to the inlet guide vanes 14 would be $IGV_{NS}$ developed in execution stage 200 of the feed back subroutine 68. Thus, the flow rate error would be minimized by adjusting the inlet guide vanes 14.

Figure 10:
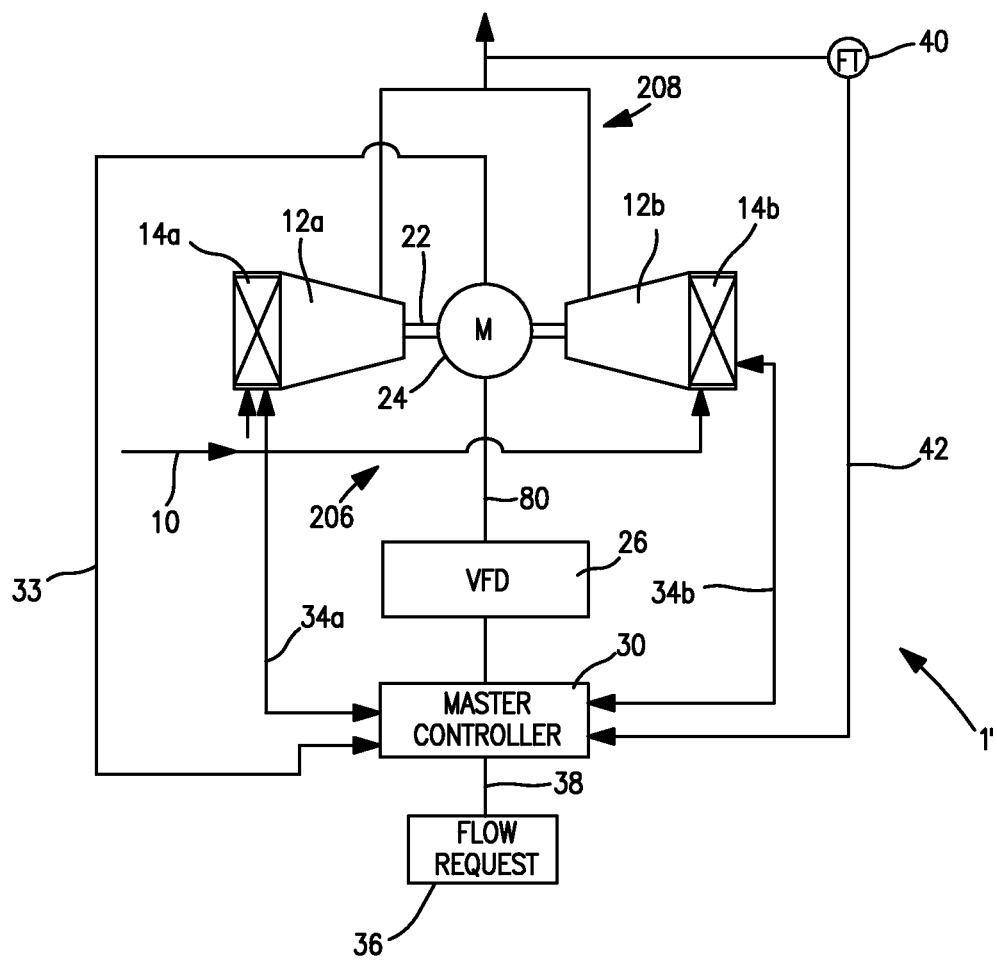
FIG. 10 is an alternative embodiment of a compression system for carrying out a method in accordance with the present invention.

With reference to FIG. 10, it is understood that the present invention has applicability to a compression system 1' in which the compressed air stream 10 is introduced into two compressors 12a and 12b from dual feeds 206 to produce a compressed gas stream 20' from dual outlets 208. The compressors 12a and 12b are mounted on the ends of the motor shaft 22 of the motor 24 and are provided with inlet guide vanes 14a and 14b that are controlled through electrical connections 34a and 34b that transmit inlet guide vane positioning signals thereto from the master controller 30. Electrical connections 34a and 34b also transmit signals from the inlet guide vanes 14a and 14b back to the master controller 30 to indicate the position of vanes within the inlet guide vanes 14a and 14b. The programming to control the speed of motor 24 and the position of vanes within inlet guide vanes 14a and 14b could be the same as outlined above with respect to the compression system 1 discussed above with identical inlet guide vane positioning signals sent to inlet guide vanes 14a and 14b and with the programming reacting to the position of the vanes of one of the inlet guide vanes 14a and 14b since the same would be identical units. Furthermore, the speed signal would be generated in an identical manner to control the speed of motor 24 to that outlined above with such speed set at the uppermost limit of the restricted speed zone where a flow request were generated that would otherwise require a motor speed within the restricted speed zone and with the flow rate adjusted by the inlet guide vanes 14a and 14b.

As is apparent from the above discussion; and FIG. 4 in particular, a byproduct of increasing or decreasing flow with a simple speed increase or decrease is accompanied by an increase or decrease in the pressure ratio, respectively. Since many industrial applications involve multiple compression turbomachines in a series arrangement (also known as a compression train), and benefit from or need for both control over flow as well as overall train pressure ratio, it is possible to employ the present invention in such a compression train as the in the initial stages or stages of compression. Pressure would be recovered in subsequent stages by an increase of the speed of the downstream stages. It is also possible to employ the present invention as illustrated in an application where the flow rate oscillates about the restricted speed zone and therefore, there are no major pressure excursions and where such pressure excursions are able to be tolerated in such application.

While the present invention has been described with reference to preferred embodiments, as would occur to those skilled in the art, numerous changes and omissions thereof could be made without departing from the spirit and scope of the present invention as set forth in the appended claims.

We claim:

1. A method of producing a compressed gas and controlling flow rate of the compressed gas, said method comprising:
   compressing a gas within a compression system having an electric motor and at least one stage of compression directly coupled to the electric motor and configured to compress a gas and thereby to produce the compressed gas, the compression system having a restricted speed zone corresponding to a range of speeds of the electric motor at which vibrational modes can damage the compression system;
   determining a flow rate and a desired flow rate of the compressed gas through the compression system;
   controlling the flow rate of the compressed gas through the compression system to produce the desired flow rate by adjusting inlet guide vanes of a centrifugal compressor of the at least one stage of compression and by adjusting the speed of the electric motor and therefore, an impeller of the centrifugal compressor with a speed controller;
   wherein, when the desired flow rate is able to be obtained with the speed of the electric motor situated above or below the restricted speed zone, the flow rate of the compressed gas through the compression system is controlled by adjusting the speed of the electric motor with the speed controller and with the inlet guide vanes set at a 0° swirl angle; and
   wherein, when the desired flow rate is not able to be obtained without the speed of the electric motor situated within the restricted speed zone, the flow rate of the compressed gas through the compression system is controlled by setting the speed of the electric motor with the speed controller at an upper speed, above the restricted speed zone and adjusting the inlet guide vanes to obtain the desired flow rate;
   wherein, when the speed of the electric motor is set at the upper speed, above the restricted speed zone and the desired flow rate requires adjusting the speed of the electric motor to a speed below the restricted speed zone, the speed of the electric motor is decreased in decreasing speed steps until a lower speed, below the restricted speed zone, is obtained and the inlet guide vanes are successively opened during each of said decreasing speed steps such that the inlet guide vanes are set at the 0° swirl angle when the speed of the electric motor is at the lower speed, below the restricted speed zone; and
   wherein, when the speed of the electric motor is set below the restricted speed zone and the desired flow rate requires adjusting the speed of the electric motor to a new speed above the restricted speed zone, the speed of the electric motor is increased in increasing speed steps until the new speed, above the restricted speed zone, is obtained and the inlet guide vanes are successively closed during each of said increasing speed steps such that the position of the inlet guide vanes required to obtain the desired flow rate will be reached when the new speed, above the restricted speed zone is reached.

2. The method of claim 1, wherein the step of determining a flow rate of the compressed gas through the compression system further comprises measuring the flow rate of the compressed gas downstream of the compression system to obtain a measured flow rate and the step of controlling the flow rate of the compressed gas further comprises comparing the measured flow rate with the desired flow rate to obtain an error in the desired flow rate if a difference between the measure flow rate and the desired flow rate exists and adjusting the inlet guide vanes and the speed of the electric motor with a speed controller to minimize the error.

3. The method of claim 1, wherein the electric motor is a high speed permanent magnet motor and the speed controller is a variable frequency drive.

4. The method of claim 3, wherein:
the compression system has two stages of compression to compress the gas;
the centrifugal compressor is a first centrifugal compressor mounted on one end of a motor shaft of the high speed permanent magnet motor to form a first of the two stages of compression and to compress the gas to a first pressure; and
a second centrifugal compressor, in flow communication with the first centrifugal compressor, is mounted on the other end of the motor shaft to form a second of the two stages of compression to further compress the gas to a second pressure, higher than the first pressure.

5. The method of claim 3, wherein:
the compression system has two centrifugal compressors having a common feed through which the two centrifugal compressors are fed with the gas and a common outlet from which the compressed gas is discharged;
the centrifugal compressor is a first of the two centrifugal compressors mounted on one end of a motor shaft of the high speed permanent magnet motor;
a second of the two centrifugal compressors is mounted on the other end of the motor shaft; and
each of the first and the second of the two centrifugal compressors have the inlet guide vanes.

6. A method of compressing a gas comprising the steps of:
(i) compressing the gas in a series of compression stages from a lower pressure to a higher pressure, each compression stage having a compressor driven by a variable speed motor having a restricted speed zone, and wherein two of the compression stages are driven by a first variable speed motor;
(ii) adjusting the speed of the first variable speed motor to increase or decrease the flow rate of the compressed gas from each compressor toward desired flow rates and wherein the speed of the first variable speed motor remains situated above or remains situated below the restricted speed zone; and
(iii) further adjusting the flow rate of the gas to one or both compressors by adjusting inlet guide vanes associated with the respective compression stages to avoid the speed of the first variable speed motor being situated within the restricted speed zone;
wherein, when the speed of the first variable speed motor is above the restricted speed zone and the inlet guide vanes are adjusted to a position not equal to a 0° swirl angle and a new speed of the first variable speed motor, below the restricted speed zone, is required to obtain a new desired flow rate, the method further comprises the steps of:

(iv) decreasing the speed of the first variable speed motor in decreasing speed steps until a lower speed of the first variable speed motor, below the restricted speed zone, is obtained;
(v) successively opening the inlet guide vanes during each of said decreasing speed steps such that the inlet guide vanes are set at the 0° swirl angle at the lower speed, below the restricted speed zone; and
(vi) further decreasing the speed of the first variable speed motor until the new speed is obtained below the restricted speed zone.

7. A method of compressing a gas comprising the steps of:
(i) compressing the gas in a series of compression stages from a lower pressure to a higher pressure, each compression stage having a compressor driven by a variable speed motor having a restricted speed zone, and wherein two of the compression stages are driven by a first variable speed motor;
(ii) adjusting the speed of the first variable speed motor to increase or decrease the flow rate of the compressed gas from each compressor toward desired flow rates and wherein the speed of the first variable speed motor is situated above or below the restricted speed zone; and
(iii) further adjusting the flow rate of the gas to one or both compressors by adjusting inlet guide vanes associated with the respective compression stages to avoid the speed of the first variable speed motor being situated within the restricted speed zone;
wherein, when the speed of the first variable speed motor is below the restricted speed zone and the inlet guide vanes are opened and a new speed of the first variable speed motor, above the restricted speed zone, is required to obtain a new desired flow rate, the method further comprises the steps of:
(iv) increasing the speed of the first variable speed motor in increasing speed steps until an upper speed of the first variable speed motor, above the restricted speed zone, is obtained; and
(v) successively closing the inlet guide vanes during each of said increasing speed steps such that the inlet guide vanes are set at the position required to obtain the new desired flow rate when the upper speed of the first variable speed motor, above the restricted speed zone is reached.

8. The method of claim 6 or claim 7, wherein the two compression stages are in series and wherein a first centrifugal compressor is mounted on one end of a motor shaft of the first variable speed motor to form a first of the two stages of compression and to compress the gas to a first pressure and a second centrifugal compressor, in flow communication with the first centrifugal compressor, is mounted on the other end of the motor shaft to form a second of the two stages of compression to further compress the gas to a second pressure, higher than the first pressure.

9. The method of claim 6 or claim 7, wherein the two compression stages are in parallel and wherein a first centrifugal compressor is mounted on one end of a motor shaft of the first variable speed motor to form a first of the two stages of compression and a second centrifugal compressor is mounted on the other end of the motor shaft to form a second of the two stages of compression and the first and second centrifugal compressors have a common feed through which the first and second centrifugal compressors are fed with the gas and a common outlet from which the compressed gas is discharged from the first and second centrifugal compressors.

* * * * *